(12) United States Patent
Pu et al.

(10) Patent No.: US 8,925,485 B2
(45) Date of Patent: Jan. 6, 2015

(54) INTELLIGENT PET-FEEDING DEVICE

(75) Inventors: Yueh-Ju Pu, Miaoli County (TW);
Ming-Chang Teng, Hsinchu (TW);
Ching-Yi Kuo, Kaohsiung (TW);
Cheng-Hua Wu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 615 days.

(21) Appl. No.: 12/821,835

(22) Filed: Jun. 23, 2010

(65) Prior Publication Data

US 2011/0139076 A1 Jun. 16, 2011

(30) Foreign Application Priority Data

Dec. 10, 2009 (TW) .............................. 98223107 U

(51) Int. Cl.
*A01K 5/00* (2006.01)
*A01K 5/02* (2006.01)
*A01K 5/01* (2006.01)

(52) U.S. Cl.
CPC .................. *A01K 5/0114* (2013.01); *A01K 5/02* (2013.01); *A01K 5/0291* (2013.01)
USPC .......... 119/51.02; 119/53; 119/56.1; 119/719

(58) Field of Classification Search
USPC .......... 119/51.02, 51.11, 51.12, 51.13, 51.14, 119/51.15, 52.1, 53, 53.5, 54, 56.1, 57, 119/57.92, 719
See application file for complete search history.

(56) References Cited

U.S. PATENT DOCUMENTS

| | | | | |
|---|---|---|---|---|
| 4,733,634 A | * | 3/1988 | Hooser ........................ | 119/51.12 |
| 6,041,737 A | * | 3/2000 | Hennigan ..................... | 119/165 |
| 6,044,795 A | * | 4/2000 | Matsuura et al. ........... | 119/51.02 |
| 6,062,166 A | | 5/2000 | Macrina | |
| 6,761,131 B2 | * | 7/2004 | Suzuki ........................ | 119/174 |
| 6,983,719 B2 | * | 1/2006 | Armstrong ................. | 119/51.02 |
| 7,040,249 B1 | * | 5/2006 | Mushen ...................... | 119/51.5 |
| 7,124,707 B1 | * | 10/2006 | Clarke ........................ | 119/51.02 |
| 7,380,518 B2 | * | 6/2008 | Kates .............................. | 119/72 |
| 7,458,336 B2 | * | 12/2008 | Eu .............................. | 119/51.02 |
| 7,832,355 B2 | * | 11/2010 | Mills .......................... | 119/51.02 |
| 7,895,973 B1 | * | 3/2011 | Whelan ...................... | 119/51.02 |
| 8,061,300 B2 | * | 11/2011 | McElroy, Jr. .............. | 119/61.55 |
| 2004/0194714 A1 | | 10/2004 | Lee | |
| 2007/0044723 A1 | * | 3/2007 | Anderbery ................ | 119/51.02 |
| 2007/0295277 A1 | * | 12/2007 | Kin et al. ................... | 119/51.02 |
| 2009/0095223 A1 | * | 4/2009 | Szutu ......................... | 119/51.11 |
| 2010/0263596 A1 | * | 10/2010 | Schumann et al. ........ | 119/51.02 |

FOREIGN PATENT DOCUMENTS

| | | | |
|---|---|---|---|
| CN | 201025815 | | 2/2008 |
| CN | 101726345 | * | 6/2009 |
| JP | 11018608 | | 1/1999 |
| JP | 2002065093 | | 3/2002 |
| KR | 20020020993 A | | 3/2002 |
| WO | 03015003 | | 2/2003 |

* cited by examiner

*Primary Examiner* — David Parsley
(74) *Attorney, Agent, or Firm* — WPAT, PC; Justin King

(57) ABSTRACT

An intelligent pet-feeding device is disclosed, which comprises: a frame, configured with at least one opening; a storage tank, for storing at least one kind of food while enabling each kind of food to be transported out of the frame from it corresponding opening; a communication module, capable of performing a wireless communication with an operator at a remote end; an imaging module, for capturing images and thus generating image signals accordingly; an audio transceiver module, for receiving and transmitting audio signals; and a central processing unit, electrically connected to the communication module, the imaging module and the audio transceiver module for processing signals received thereby and generated therefrom.

23 Claims, 3 Drawing Sheets

INTELLIGENT PET-FEEDING DEVICE

TECHNICAL FIELD

The present disclosure relates to an intelligent pet-feeding device. The device is controlled remotely and capable to feed pet. It is not only designed for the user to interact with pet animals, but also automatically to acquire and recognize information from interactions between pet and the device; so that the requirements, generated from the recognizing information, of the pet animals could be satisfied with respect to their health concerns.

TECHNICAL BACKGROUND

The present disclosure relates to a pet-feeding device and more particularly with intelligent interaction functions which utilize the owner to feed and interact with his/her pet animal remotely, and also sense and record information about the activities of the pet automatically in order to take healthy care to the pet.

TECHNICAL SUMMARY

The present disclosure relates to an intelligent pet-feeding device which is capable of feeding automatically and/or by the user through wireless communication control, interacting with pets remotely, sensing and recording physiological information for a pet animal. Therefore, the requirements of the pet animals with respect to their health concerns could be satisfied by the feeding and interacting process.

In an embodiment, the present disclosure provides an intelligent pet-feeding device, comprising: a frame, configured with at least one output; at least one storage tank, for storing at least one kind of food while enabling each kind of food to be transported out of the frame from its corresponding output; a communication module, which is capable of performing a wireless communication with an operator at a remote end; an imaging module, for capturing images and thus generating image signals accordingly; an audio transceiver module, for receiving and transmitting audio signals; and a central processing unit, electrically connected to the communication module, the imaging module and the audio transceiver module for processing signals received thereby and generated therefrom.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
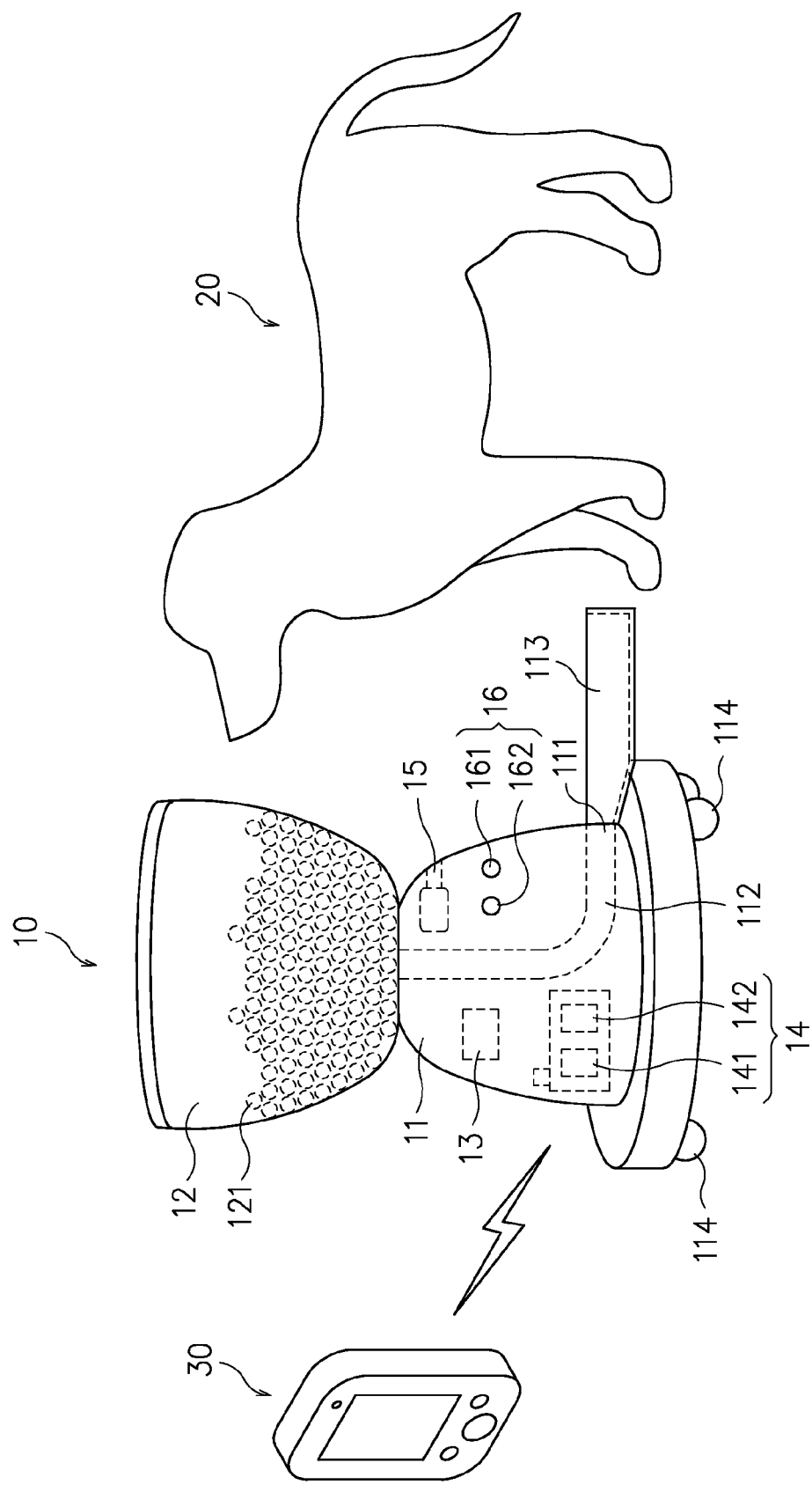
FIG. 1 is a sectional view of an intelligent pet-feeding device according to a first embodiment of the present disclosure.

Please refer to FIG. 1, which is a sectional view of an intelligent pet-feeding device according to a first embodiment of the present disclosure. As in FIG. 1, the intelligent pet-feeding device 10 has a frame 11, which is configured with a storage tank 12 at the top thereof to be used for storing a food 121. Moreover, the frame 11 is formed with an output 111, which is connected with the storage tank 12 through a channel 112. As there is a plate 113 disposed at a position corresponding to the output 111, the food 121 can be dispensed out of the frame 11 through the output 111 and then fall on the plate 113. In FIG. 1, the frame 11 is being fitted with rollers 114 at the bottom thereof, which are provided for enabling the frame 11 to move and rotate with the rotation thereof. It is noted that the rollers 114 can be driving wheels. There is a central processing unit 13 disposed inside the frame 11 in a manner of that it is electrically connected to a communication module 14, an imaging module 15 and an audio transceiver module 16. Wherein, the communication module 14 is designed to communicate wirelessly with a remote device 30, whereas the remote device 30 can be a handheld 3G cellular phone, or a personal digital assistant, or even it can be a notebook computer or a desktop computer. In this embodiment, the communication module 14 further comprises a 3G ($3^{rd}$ generation) wireless communication unit 141 and a remote control unit 142, so that it is able to be communicated wirelessly with the remote device 30 through the operation of the 3G wireless communication unit 141, and also it can receive a remote signal from the remote device 30 by the remote control unit 142 to be used for driving the frame 11 to move accordingly. The imaging module is designed for capturing image signals relating to pet's activities, which can be a camcorder or a camera. The audio transceiver module 16 is used to receive and transmit audio signals, which further comprises a microphone 161 and a speaker 162 as the microphone is designed for collecting sounds from a pet 20 while the speaker 162 is provided for broadcasting sounds of an operator using the remote device 30, such as the owner of the pet 20. The central processing unit 13 is designed for receiving and processing signals from the communication module 14, the imaging module 15 and the audio transceiver module 16.

Operationally, with reference to the embodiment shown in FIG. 1, a pet owner is able to use the remote device 30 to send a wireless signal through Internet to the intelligent pet-feeding device 10, in which the wireless signal received by the communication module 14 is transmitted to the central processing unit 13 where it is processed and converted into an audio signal to be transmitted to the speaker 162 of the audio transceiver module 16 for enabling the same to emit a sound of the pet owner that is calling his/her pet 20. As soon as the pet 20 hear the calling sound of its owner, it will approach the intelligent pet-feeding device 10 and response to the calling by barking, meowing, or the like, and at the same time that the imaging module 15 is enabled to capture images of the pet 20 and generate an image signal accordingly while the microphone 161 can detect the barking of the pet 20 so as to generate an audio signal accordingly. The image signal and the audio signal will be sent to the central processing unit 13 where they are processed and then transmitted to the remote device 30 by the communication module 14, so that the pet owner is able to see and hear the response of his/her pet 20 in real time. In another embodiment of the present disclosure, there can be a plurality of imaging modules 15 and audio transceiver modules 16 being mounted on the frame 11 while enabling those imaging modules 15 and audio transceiver modules 16 as well to be orientated in different directions, by that there will be no blind spot with respect to the intelligent pet-feeding device. In addition, as soon as the pet owner saw that the pet 20 is in the neighborhood of the frame 11, the pet owner will issue a feeding command through the remote device 30 to the central processing unit 13 for enabling the same to direct a specific amount of food in the storage tank 12 to be transferred out of the output 111 and thus fall on the plate 113 for feeding the pet 20. However, if the pet 20 is not responding to the calling of its owner and approaching to the frame 11, the pet owner can issue a remote control command through the remote device 30 to the central processing unit 13 for enabling the same to direct the frame 11 to move accordingly. During the moving of the frame 11, the pet owner is able to search and find the position of the pet 20 through the images captured by the imaging module 15. Usually, the pet will find the moving intelligent pet-feeding device 10 to be an interesting target and start to chase the moving pet-feeding device 10, by that the pet owner is able to interact with his/her pet 20 by directing the intelligent pet-feeding device 10 to move and thus playing a chasing game with his/her pet 20. Moreover, by enticing the pet 20 to chase the moving pet-feeding device 10, the pet can get sufficient exercise and the same time that its reaction ability is trained. At the end of the interaction, the pet owner is able to issue a feeding command through the remote device 30 to the central processing unit 13 for enabling the same to direct a specific amount of food in the storage tank 12 to be transferred out of the output 111 and thus fall on the plate 113 for feeding the pet 20 for feeding the pet 20, or as reward to the interaction.

Figure 2:
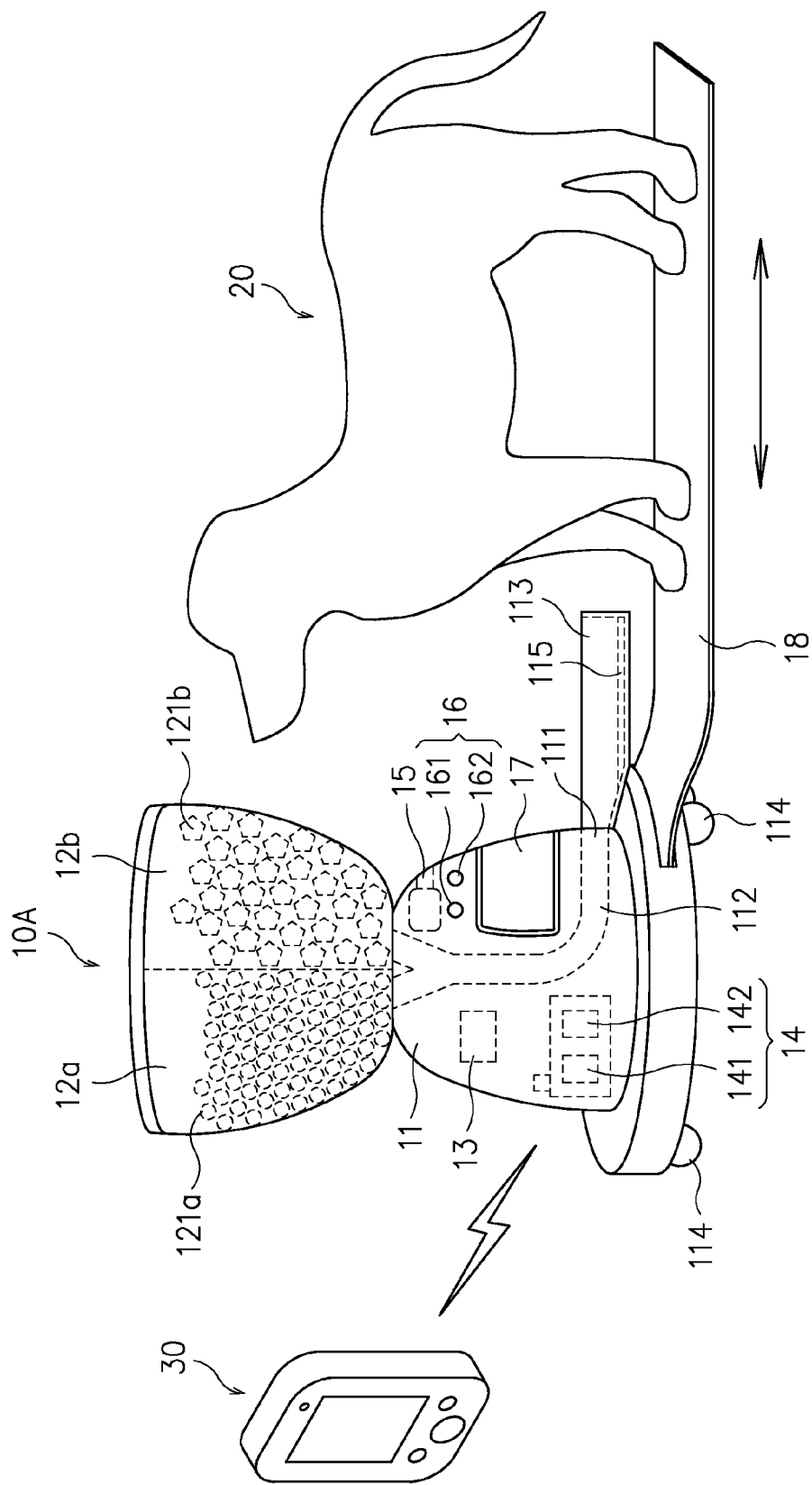
FIG. 2 is a schematic view is a sectional view of an intelligent pet-feeding device according to a second embodiment of the present disclosure.
Figure 3:
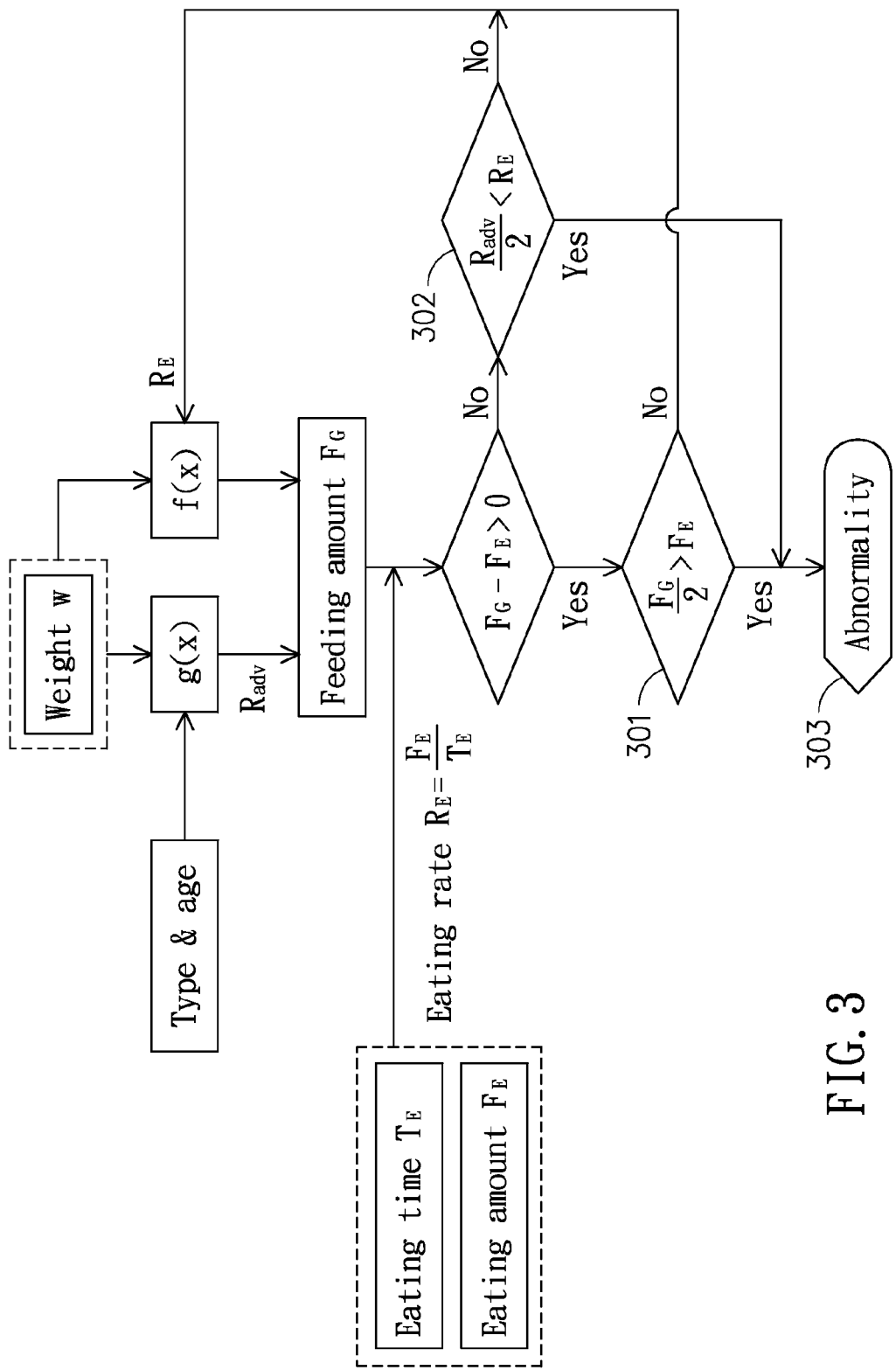
FIG. 3 is a flow chart depicting a feeding procedure of an intelligent pet-feeding device according to an embodiment of the present disclosure.

Please refer to FIG. 2, which is a schematic view of an intelligent pet-feeding device according to a second embodiment of the present disclosure. In FIG. 2, the intelligent pet-feeding device 10A has a frame 11, which is configured with two storage tanks 12a, 12b at the top thereof to be used for storing two different kinds of foods 121a, 121b respectively. Moreover, the frame 11 is formed with an output 111, which is connected with the two storage tanks 12a, 12b through a channel 112. As there is a plate 113 disposed at a position corresponding to the output 111, the foods 121a, 121b can be dispensed out of the frame 11 through the output 111 and then the foods 121a, 121b fall on the plate 113. In addition, there is a supply measurement device 115 configured in the plate 113 to be used for measuring the weight of the food in the plate 113. In FIG. 1, there is a central processing unit 13 disposed inside the frame 11 in a manner that it is electrically connected to a communication module 14, an imaging module 15 and an audio transceiver module 16. The second embodiment of the present disclosure is characterized in that: there is a display device 17 mounted on the frame 11, which is also electrically connected with the central processing unit 13. Note that the display device can be orientated toward any direction at will, but is preferred to be orientated toward the direction of the plate 113. In addition, the intelligent pet-feeding device 10A further comprises a weight scale 18, which is provided to measure the body weight of the pet 20, and is a retractable device with respect to the frame 11 in a manner which it is capable of being enabled to extend out of the frame 11 as it is capable of being received inside the frame 11. Moreover, the weight scale 18 is a flexible weight scale made up of a flexible printed circuit board and a flexible conductive polymer layer, for the purpose to be roll up and received inside the frame 11. It is noted that the weight scale 18 can also be orientated toward any direction at will, but is preferred to be orientated toward the direction of the plate 113. Please refer to FIG. 3, which is a flow chart depicting a feeding procedure of an intelligent pet-feeding device according to an embodiment of the present disclosure. Operationally, a user will first manually input information related to the type and age of its pet into an intelligent pet-feeding device of the present disclosure for initiating the same. Then, when the pet steps on the weight scale 18 of the intelligent pet-feeding device, information including the type, the age, and the weight of the pet are sent to calculate the initial feeding amount by a default feeding function, i.e. g(x), embedded in the central processing unit 13, so as to obtain an initial feeding amount $F_{adv}$ (=$F_G$) and an initial feeding rate $R_{adv}$. During the feeding process, information related to the eating time $T_E$ and the appetite $F_E$ will be measured by the detectors mounted on the intelligent pet-feeding device, which are then being used in a comparison performed in the central processing unit 13. In the comparison, if the amount of pet's appetite is smaller than the feeding amount, i.e. $F_G - F_E > 0$, the comparison process will proceed to step 301; otherwise the comparison process will proceed to step 302. At step 301, an evaluation is performed for determining whether the amount of food left is far larger than a predetermined threshold in view of the feeding amount according to the equation:

$$\frac{F_G}{2} > F_E,$$

if so, an abnormality report will be recorded, issued, and/or sent to the pet's owner; otherwise, the central processing unit 13 will generate a normal eating rate, i.e.

$$R_E = \frac{F_E}{T_E},$$

to a learning module f(x) where the normal eating rate as well the eating time $T_E$, and the eating amount $F_E$ are registered to be used in a learning process for adjusting the feeding amount $F_G$. At step 302 when $F_G - F_E \leq 0$, another evaluation is performed for comparing the eating rate, $$\text{i.e. } R_E = \frac{F_E}{T_E},$$

with the initial feeding rate $R_{adv}$ according to the equation:

$$\frac{R_{adv}}{2} < R_E;$$

if so, an abnormality report will be recorded and issued; otherwise, the central processing unit 13 will generate a normal eating rate, i.e. $R_E = \frac{F_E}{T_E}$, to a learning module f(x) where the normal eating rate as well the eating time $T_E$ and the eating amount $F_E$ are registered to be used in a learning process for adjusting the feeding amount $F_G$.

Operationally, with reference to the embodiment shown in FIG. 2, a pet owner is able to use the remote device 30 to send a wireless signal through Internet to the intelligent pet-feeding device 10A, in which the wireless signal received by the communication module 14 and then transmitted to the central processing unit 13 of which is processed and converted into an audio signal and a video signal while enabling the audio signal to be transmitted to the speaker 162 of the audio transceiver module 16 for enabling the same to emit a sound of the pet owner who is calling his/her pet 20. In the meanwhile, the video signal is transmitted to the display device 17 for display images of the pet owner. As soon as the pet 20 hear the calling sound of its owner, usually, it will go to approach the intelligent pet-feeding device 10A and response to the calling by barking, meowing, or the like while seeing the images of its owner on the display device 17, and at the same time that the imaging module 15 is enabled to capture images of the pet 20 and generate an image signal accordingly while the microphone 161 can detect the barking of the pet 20 so as to generate an audio signal accordingly. The image signal and the audio signal will be sent to the central processing unit 13 of which they are processed and then transmitted to the remote device 30 by the communication module 14, so that the pet owner is able to see and hear the response of his/her pet 20 in real time. In an other embodiment of the present disclosure, there can be also with a plurality of imaging modules 15 and audio transceiver modules 16 mounted on the frame 11. The imaging modules 15 and audio transceiver modules 16 can be orientated in different directions, and by this way, there will be no blind spot with respect to the intelligent pet-feeding device. In addition, as soon as the pet owner saw that the pet 20 is around the frame 11, the pet owner will issue a feeding command through the remote device 30 and sent it to the central processing unit 13 for enabling the same to direct respectively two specific amounts of foods 121a, 121b in the two storage tank 12a, 12b to be transferred out of the output 111 and thus fall on the plate 113 for feeding the pet 20. It is noted that the feeding command can direct the central processing unit 13 to allow only one of the two kinds of foods 121a, 121b to be dispensed, or it can direct the central processing unit 13 to allow both kinds of foods 121a, 121b to be dispensed at the same time. As the amount of foods on the plate 113 is weighed by the supply measurement device 115 at all time during the feeding process, the feeding condition with respect to the appetite of the pet 20 can be observed. For instance, when the food on the plate is eaten completely in a very short period of time, the pet owner can direct the central processing unit 13 for allowing more foods to be dispensed, because the pet might still be hungry. In addition, when the pet 20 approaches the frame 11, it can step on the weight scale 18 so that the weight of the pet 20 can be observed by the owner so as to known whether his/her pet is overweight and thus control the amount of food to be dispensed accordingly. It is noted that the signals detected by the supply measurement unit 115 and the weight scale 18 are both sent to the central processing unit 13 to analysis the pet's physiological requirements and daily activities. Thereby, by comparing with a food intaking model embedded inside the central processing unit 13, any abnormality with respect to the amount of food being consumed by the pet can be detected, and thus, the health condition of the pet can be evaluated in a real-time manner. And if necessary, the real-time health condition of the pet can be sent to the pet owner through the communication module. In an embodiment of the present disclosure, after registering and analyzing the food intaking condition relating to the pet 20 for a long period of time, a learning process in the intelligent pet-feeding device with respect to the pet 20 can be completed, so that the intelligent pet-feeding device can automatically modify the amount of food which is provided to the pets according to its healthy and emotional condition.

However, if the pet 20 do not respond to the calling of its owner and approach to the frame 11, the pet owner can issue a remote control command through the remote device 30 to the remote control unit 142 connected to the central processing unit 13 for enabling the same to control the intelligent pet-feeding device 10A to move accordingly. By controlling of the moving intelligent pet-feeding device 10A, the pet owner is able to search and find the position of the pet 20 through the images captured by the imaging module 15. Usually, the pet will find the moving intelligent pet-feeding device 10A to be an interesting target and start to chase the moving pet-feeding device 10A, by that the pet owner is able to interact with his/her pet 20 by directing the intelligent pet-feeding device 10A to move and thus playing a chasing game with his/her pet 20. Moreover, by enticing the pet 20 to chase the moving pet-feeding device 10A, the pet can get sufficient exercise. At the same time, its reaction ability is trained. At the end of the interaction, the pet owner will issue a feeding command through the remote device 30 to the central processing unit 13 for enabling the same to direct respectively two specific amounts of foods 121a, 121b in the two storage tank 12a, 12b to be transferred out of the output 111 and thus fall on the plate 113 for feeding the pet 20 or as reward to the interaction.

In addition, there can be an environmental sensing unit of each of the two aforesaid embodiments, being configured inside the frame 11 for sensing environmental parameters including temperature, moisture, and the like, or have a physiological parameter detecting unit for detecting physiological parameters of a pet as the physiological parameters includes heat beat, aspiration, pulse and the like. It is noted that the physiological parameter detecting unit can be an ultra-wideband (UWB) biosensor. In addition, there can be an audio recognition system, being configured inside the frame 11 for identifying any sound from the pet and the location of the pet, which is comprised of: a detection unit, for detecting any sound from the pet and the location of the pet while issuing a digital sound signal and a position detection signal accordingly; and a processor, capable of recognizing an emotion of the pet basing upon the digital sound signal so as to generate a corresponding control signal, and capable of processing the position detection signal so as to generate a corresponding driving signal. It is noted that the processor can be integrated with the central processing unit 13.

In this embodiment, the intelligent pet-feeding device is able to base on any one or any combination of the data obtained respectively from the environment sensing unit. Also, the detecting unit of physiological and environmental parameters is used to adjust automatically the amount of food provided to the pet for feeding so as to satisfy requirements of the pet with respect to its health concerns. For instance, when there is a condition of high temperature and high moisture being detected by the environment sensing unit, it might be a humid and hot day, and the appetite of the pet might be adversely affected. The intelligent pet-feeding device will automatically reduce the amount of food provided to the pet. On the other hand, when physiological parameter detecting unit or the audio recognition system detects that the pet is excited after exercise, the intelligent pet-feeding device will automatically increase the amount of food being provided to the pet.

Moreover, the interactive feeding process described in the foregoing embodiments is initiated by the pet owner who actively initiates a contact with his/her pet 20. On the other hand, the interactive feeding process can also be initiated by the pet 20. Referring the embodiment shown in FIG. 1, for example, when the pet 20 is hungry or feeling lonely, it will usually emitted sounds which can be detected by the microphone 161, and thus the audio signal is transmitted to the central processing unit 13 where it is processed and transmitted to the remote device 30 through the communication module 14 for informing its owner. Then, the informed owner can observe the condition of his/her pet by using the remote device 30 in a manner similar to the abovementioned embodiments.

To sum up, the intelligent pet-feeding device can be used for a pet owner to interact with his/her pet through the frame and the audio/video communication units. The device is capable of interacting with pet animals in a feeding process so as to that the requirements of the pet animals with respect to their health concerns can be understood and satisfied. Also, the amount of food provided to a pet animal can be modified according to the age, weight variation and emotion status of the pet.

While several embodiments of the disclosure have been set forth for the purpose of disclosure, modifications of the disclosed embodiment of the disclosure as well as other embodiments thereof may occur to those skilled in the art. Accordingly, the appended claims are intended to cover all embodiments which do not depart from the spirit and scope of the disclosure.

What is claimed is:
1. An intelligent pet-feeding device, comprising:
a frame, configured with at least one output;
at least one storage tank, for storing at least one kind of food while enabling each kind of food to be transported out of the frame from its corresponding output;
a communication module, capable of performing a wireless communication with a remote end;
an imaging module, for capturing images and thus generating image signals accordingly;
an audio transceiver module, for receiving and transmitting audio signals, comprising:
at least one microphone, for collecting sounds from a pet and an environment in the vicinity of the intelligent pet-feeding device;
an audio recognition system, for identifying any sound from the pet and the vicinity of the pet, comprising:
a detection unit, for detecting any sound from the pet and the vicinity of the pet and issuing a digital sound signal and a position detection signal indicating position of the pet accordingly; and
a processor, capable of recognizing an emotion of the pet basing upon the digital sound signal so as to generate a corresponding control signal, and capable of processing the position detection signal so as to generate a corresponding driving signal for moving the intelligent pet-feeding device; and
at least one speaker, for broadcasting sounds of an operator generated at the remote end;
a pet weight scale, for measuring body weight of said pet;
an imaging module, for capturing image signals of pet activities in the vicinity of the intelligent pet-feeding device;
a driving mechanism, configured for enabling the frame to move;
an interaction interface, for providing bidirectional signal communication between the intelligent pet-feeding device and the remote end, enabling the operator at the remote end to visually and audibly observe the pet, and effect sound generation by at least one speaker; and
a central processing unit, electrically connected to the communication module, the imaging module, the audio transceiver module, the weight scale, the at least one microphone, the at least one speaker, the imaging module, the driving mechanism, and the interaction interface, for processing signals received thereby and generated therefrom;
wherein the remote end is in communication with the central processing unit to effect real-time communication and visual and audio observation of a pet in the vicinity of the intelligent pet-feeding device, and said central processing unit determines whether said pet's appetite is greater than a feeding amount according to the equation:

(initial feeding amount−pet's appetite)>0.

2. The intelligent pet-feeding device of claim 1, wherein the communication module further comprises:
a 3G (3rd generation) wireless communication unit.
3. The intelligent pet-feeding device of claim 1, wherein the communication module further comprises:
a remote control unit, for receiving a remote control signal to be used for driving the frame to move accordingly.
4. The intelligent pet-feeding device of claim 1, wherein the imaging module is a device selected from the group consisting of: a camcorder and a camera.
5. The intelligent pet-feeding device of claim 1, further comprising:
an environment sensing unit, for sensing environmental parameters including temperature and moisture.
6. The intelligent pet-feeding device of claim 1, further comprising:
a physiological parameter detecting unit, for detecting physiological parameters of the pet as the physiological parameters includes heart beat, aspiration, and pulse.
7. The intelligent pet-feeding device of claim 6, wherein the physiological parameter detecting unit is substantially a ultra-wide-band (UWB) biosensor.
8. The intelligent pet-feeding device of claim 1, further comprising:
a display device, for displaying images of the remote end.
9. The intelligent pet-feeding device of claim 1, wherein the pet weight scale is a retractable device with respect to the frame in a manner that it is capable of being enabled to extend out of the frame.
10. The intelligent pet-feeding device of claim 1, wherein the weight scale is a flexible weight scale made up of a flexible printed circuit board and a flexible conductive polymer layer.
11. The intelligent pet-feeding device of claim 1, wherein the frame has a plurality of food storage tanks configured therein to be used for storing at least two kinds of foods.
12. The intelligent pet-feeding device of claim 1, wherein there is a plate disposed at the output of the frame, and there is a supply measurement device configured in the plate to be used for measuring the weight of the food in the plate.
13. The intelligent pet-feeding device of claim 1, wherein when the pet steps on the weight scale, said central processing unit receives and processes signals generated and received to control the intelligent pet-feeding device to selectively dispense food based on decisions made by processing received information reflecting information related to the pet and environment comprising the generated image signals, audio signals, and weight of the pet.

14. The intelligent pet-feeding device of claim 1, wherein the intelligent pet-feeding device is configured for the central processing unit to control the components of the intelligent pet-feeding device to selectively dispense food based on decisions made by processing received information related to the pet and environment comprising generated image signals, audio signals, and the type, age, and weight of the pet.

15. The intelligent pet-feeding device of claim 1, wherein the intelligent pet-feeding device is configured for the central processing unit to make a determination of whether the amount of food left is larger than the feeding amount by a predetermined threshold is made according to the equation:

$$\left(\frac{\text{initial feeding amount}}{2}\right) > \text{pet's appetite.}$$

16. The intelligent pet-feeding device of claim 1, wherein the intelligent pet-feeding device is configured for the central processing unit to determine the initial feeding amount based on growth of age, the type and weight of the pet, and the pet's normal eating habits, serving to configure the intelligence system to calculate the preset feeding amount and determine the feeding amount.

17. The intelligent pet-feeding device of claim 16, wherein the intelligent pet-feeding device is configured for the central processing unit to make an evaluation for determining whether the amount of food left is far larger than the feeding amount according to the equation:

$$\left(\frac{\text{initial feeding amount}}{2}\right) > \text{pet's appetite.}$$

18. The intelligent pet-feeding device of claim 1, wherein the intelligent pet-feeding device is configured for the central processing unit to set the normal eating rate to the ratio of pet's appetite to eating time according to ratio of the pet's appetite to the eating time defined by the quantity:

$$\left(\frac{\text{pet's appetite}}{\text{eating time}}\right).$$

19. The intelligent pet-feeding device of claim 1, wherein the intelligent pet-feeding device is configured for the central processing unit to make a determination of whether the eating rate is greater than a predetermined fraction of the initial feeding rate is made according to the equation:

$$\left(\frac{\text{initial feeding rate}}{2} < \text{eating rate}\right);$$

wherein the eating rate is defined as the ratio of pet's appetite to eating time according to the equation:

$$\text{eating rate} = \frac{\text{pets's appetite}}{\text{eating time}}.$$

20. The intelligent pet-feeding device of claim 19, wherein the intelligent pet-feeding device is configured for the central processing unit to set the initial feeding amount based on growth of age, the type and weight of the pet, and the pet's normal eating habits, serving to configure the intelligence system to calculate the preset feeding amount and determine the initial feeding rate.

21. The intelligent pet-feeding device of claim 20, wherein the intelligent pet-feeding device is configured for the central processing unit to make an evaluation performed for comparing the eating rate with the initial feeding rate according to the equation:

$$\left(\frac{\text{initial feeding rate}}{2}\right) < \text{eating rate.}$$

22. The intelligent pet-feeding device of claim 1, wherein the driving mechanism further comprises:
 a plurality of rollers configured for enabling the frame to move and rotate; and
 at least one driving wheel for driving at least one of the plurality of rollers.

23. The intelligent pet-feeding device of claim 1, wherein the central processing unit is configured for the intelligent pet-feeding device to:
 determine an initial feeding amount and an initial feeding rate using a default feeding function module when a pet steps on the weight scale of the intelligent pet-feeding device;
 set a default feeding amount equal to the initial feeding amount;
 determine an eating time and a left-over amount by detectors mounted on the intelligent pet-feeding device;
 evaluate whether the left-over amount is greater than a predetermined threshold if the default feeding amount is greater than the pet's appetite;
 record and issue a first abnormality report to the pet owner if the left-over amount is greater than the predetermined threshold, else generating and storing a normal eating rate in a learning module and registering the normal eating rate, eating time, and eating amount for adjusting the initial feeding amount using a learning process;
 evaluate whether the eating rate is greater than a predetermined fraction of the initial feeding rate when the default feeding amount is not greater than the pet's appetite is; and
 record and issue a second abnormality report to the pet owner if the eating rate is greater than the predetermined fraction of the initial feeding rate, else generating and storing the normal eating rate in the learning module and registering the normal eating rate, eating time, and eating amount for adjusting the initial feeding amount using the learning process module.

\* \* \* \* \*